(12) United States Patent
Kimura et al.

(10) Patent No.: US 8,795,514 B2
(45) Date of Patent: Aug. 5, 2014

(54) REGENERATED HYDROTREATMENT CATALYST

(75) Inventors: Nobuharu Kimura, Tokyo (JP); Yoshimu Iwanami, Tokyo (JP); Wataru Sahara, Tokyo (JP); Souichirou Konno, Tokyo (JP)

(73) Assignees: JX Nippon Oil & Energy Corporation, Tokyo (JP); Japan Petroleum Energy Center, Tokyo (JP)

( * ) Notice: Subject to any disclaimer, the term of this patent is extended or adjusted under 35 U.S.C. 154(b) by 193 days.

(21) Appl. No.: 13/521,801

(22) PCT Filed: Nov. 8, 2010

(86) PCT No.: PCT/JP2010/069840
§ 371 (c)(1),
(2), (4) Date: Jul. 12, 2012

(87) PCT Pub. No.: WO2011/086750
PCT Pub. Date: Jul. 21, 2011

(65) Prior Publication Data
US 2012/0298557 A1    Nov. 29, 2012

(30) Foreign Application Priority Data

Jan. 18, 2010  (JP) ................................ 2010-008216

(51) Int. Cl.
*C10G 49/04* (2006.01)

(52) U.S. Cl.
USPC ................ 208/209; 502/20; 502/38; 502/51; 502/52; 208/108; 208/109; 208/110; 208/112; 208/210; 208/211; 208/212; 208/213; 208/214; 208/216 R; 208/217; 208/305

(58) Field of Classification Search
USPC ................. 502/20, 38, 51–52; 208/108–112, 208/209–217, 305
See application file for complete search history.

(56) References Cited

U.S. PATENT DOCUMENTS

| 5,494,875 | A | * | 2/1996 | Usui et al. .................... 502/206 |
| 6,398,950 | B1 |  | 6/2002 | Iwamoto et al. |
| 2005/0159296 | A1 |  | 7/2005 | Ginestra et al. |

FOREIGN PATENT DOCUMENTS

| JP | 52-68890 A | 6/1977 |
| JP | 5-123586 A | 5/1993 |

(Continued)

OTHER PUBLICATIONS

Sergio L. Gonzalez-Cortes, "Comparing the hydrodesulfurization reaction of thiophene on Y—$Al_2O_3$ supported CoMo, NiMo and NiW sulfide catalysts", React Kinet Catal Lett, 2009, v97, Jun. 17, 2009, pp. 131-139.
China Office action, mail date is Nov. 26, 2013.
International Search Report for PCT/JP2010/069840, mailed Feb. 8, 2011.

(Continued)

*Primary Examiner* — Brian McCaig
(74) *Attorney, Agent, or Firm* — Greenblum & Bernstein, P.L.C.

(57) ABSTRACT

The present invention relates to a regenerated hydrotreatment catalyst regenerated from a hydrotreatment catalyst for treating a petroleum fraction, the hydrotreatment catalyst being prepared by supporting molybdenum and at least one species selected from metals of Groups 8 to 10 of the Periodic Table on an inorganic carrier containing an aluminum oxide, wherein a residual carbon content is in the range of 0.15 mass % to 3.0 mass %, a peak intensity of a molybdenum composite metal oxide with respect to an intensity of a base peak is in the range of 0.60 to 1.10 in an X-Ray diffraction spectrum, and a peak intensity of a Mo—S bond derived from a residual sulfur peak with respect to an intensity of a base peak is in the range of 0.10 to 0.60 in a radial distribution curve obtained from an extended X-ray absorption fine structure spectrum of an X-ray absorption fine structure analysis.

6 Claims, 4 Drawing Sheets

(56) References Cited

FOREIGN PATENT DOCUMENTS

| | | |
|---|---|---|
| JP | 2000-470 A | 1/2000 |
| JP | 2007-518561 A | 7/2007 |
| JP | 2007-319844 A | 12/2007 |
| JP | 2009-183891 A | 8/2009 |
| WO | 00/18508 A1 | 4/2000 |

OTHER PUBLICATIONS

English-language translation of International Preliminary Report on Patentability issued with respect to PCT/JP2010/069840, mailed Aug. 16, 2012.

Notice of Allowance issued with respect to patent family member Japanese Patent Application No. 2010-008216, mailed Dec. 6, 2011.

* cited by examiner

REGENERATED HYDROTREATMENT CATALYST

TECHNICAL FIELD

The present invention relates to a regenerated hydrotreatment catalyst having superior catalyst performance for treating a petroleum fraction.

BACKGROUND ART

Sulfur-containing compounds, nitrogen-containing compounds, oxygen-containing compounds, and the like are contained in crude petroleum as impurities, and as to petroleum fractions obtained through a step such as distillation from the crude oil, the contents of these impurities are reduced by a step of bringing the fractions into contact with a catalyst having hydrogenation activity in the presence of hydrogen, the step being referred to as hydrotreatment. Desulfurization, for reducing the contents of the sulfur-containing compounds, is especially well known. Recently, in terms of reducing environmental load, there have been stricter demands for controlling or reducing the contents of impurities including sulfur-containing compounds in petroleum products, and a large number of so-called "sulfur-free" petroleum products are being manufactured.

After a hydrotreatment catalyst used for hydrotreatment of a petroleum fraction is used for a certain period of time, its activity is lowered due to the deposition of coke or sulfur components and the like, and replacement is therefore carried out. Especially due to the increase in demand for "sulfur-free" petroleum products, a greater hydrotreating capability is required in hydrotreating facilities for petroleum fractions such as kerosene, gas oil and vacuum gas oil, which increases the frequency of catalyst replacement, resulting in increased catalyst costs and a greater amount of waste catalyst.

As a countermeasure, a regenerated catalyst regenerated from a spent hydrotreatment catalyst is partially used in these facilities (For example, see Patent Literatures 1 and 2).

CITATION LIST

Patent Literature

[Patent Literature 1] Japanese Patent Application Laid-open No. S52-68890
[Patent Literature 2] Japanese Patent Application Laid-open No. H5-123586

SUMMARY OF INVENTION

Technical Problem

In the use of a regenerated catalyst, if the activity of a hydrotreatment catalyst could be maintained even when hydrotreatment and regeneration are performed several times, the merit in using a regenerated catalyst for hydrotreatment (hereinafter, referred to as "regenerated hydrotreatment catalyst" or simply "regenerated catalyst") is further increased. However, in the regeneration of a spent catalyst for hydrotreatment (hereinafter, referred to as "spent hydrotreatment catalyst" or simply "spent catalyst"), the regeneration can recover the catalytic activity in terms of coke deposition which is one of the causes for lowering the activity of the hydrotreatment catalyst, but the regeneration itself may cause the catalytic activity to be lowered. Furthermore, the activity after regeneration may depend on the history of use before regeneration, regeneration methods, and the like, and therefore, a regenerated catalyst, especially a regenerated catalyst which has been regenerated multiple times, does not always exhibit stably sufficient activity. Also, there may be cases where it is necessary to select regeneration conditions according to the history of the spent catalyst. In the case where a regenerated catalyst is proven to have low activity after a hydrotreatment operation is initiated by packing a hydrotreatment facility with the regenerated catalyst, it is very problematic because the reduction of the treatment speed of an oil feed stock, and so on are necessary.

The present invention has been made to solve the above-described problem, and an object of the present invention is thus to provide a regenerated catalyst having excellent desulfurization activity and a method of manufacturing petroleum products using the same.

Solution to Problem

To solve the problems above, the present invention provides a regenerated hydrotreatment catalyst regenerated from a hydrotreatment catalyst for treating a petroleum fraction, the hydrotreatment catalyst being prepared by supporting molybdenum and at least one species selected from metals of Groups 8 to 10 of the Periodic Table on an inorganic carrier containing an aluminum oxide, wherein a residual carbon content is in the range of 0.15 mass % to 3.0 mass %, a peak intensity of a molybdenum composite metal oxide with respect to an intensity of a base peak is in the range of 0.60 to 1.10 in an X-Ray diffraction spectrum, and a peak intensity of a Mo—S bond derived from a residual sulfur peak with respect to an intensity of a base peak is in the range of 0.10 to 0.60 in a radial distribution curve obtained from an Extended X-ray Absorption Fine Structure (EXAFS) spectrum of an X-ray Absorption Fine Structure (XAFS) analysis, and the present invention also provides a regenerated hydrotreatment catalyst regenerated from a hydrotreatment catalyst for treating a petroleum fraction, the hydrotreatment catalyst being prepared by supporting molybdenum and at least one species selected from metals of Groups 8 to 10 of the Periodic Table on an inorganic carrier containing an aluminum oxide, wherein a residual carbon content is in the range of 0.15 mass % to 3.0 mass %, a peak intensity of a molybdenum composite metal oxide with respect to an intensity of a base peak is in the range of 0.60 to 1.10 in an X-Ray diffraction spectrum, and a ratio of $MoO_3$ is in the range of 77% to 99% in an X-ray Absorption Near-Edge Structure (XANES) spectrum of an X-ray absorption fine structure analysis.

The present invention also provides a method of manufacturing petroleum products, wherein hydrotreatment of a petroleum fraction is performed using the regenerated hydrotreatment catalyst of the present invention.

In the method of manufacturing petroleum products, conditions of the hydrotreatment of the petroleum fraction should preferably be a hydrogen partial pressure in the range of 3 to 13 MPa, LHSV in the range of 0.05 to 5 $h^{-1}$, a reaction temperature in the range of 200° C. to 410° C., a hydrogen/oil ratio in the range of 100 to 8,000 SCF/BBL, and a boiling point in the range of 130° C. to 700° C. of the petroleum fraction used as an oil feed stock.

Advantageous Effects of Invention

The present invention provides the effect in which a highly practical manufacturing process can be realized using a regenerated catalyst which has sufficient activity and is low-priced for the manufacture of petroleum products, and is very useful for cost reduction, reducing the amount of discharged waste, making hydrotreatment of petroleum fractions efficient, and so on.

DESCRIPTION OF EMBODIMENTS

Figure 1:
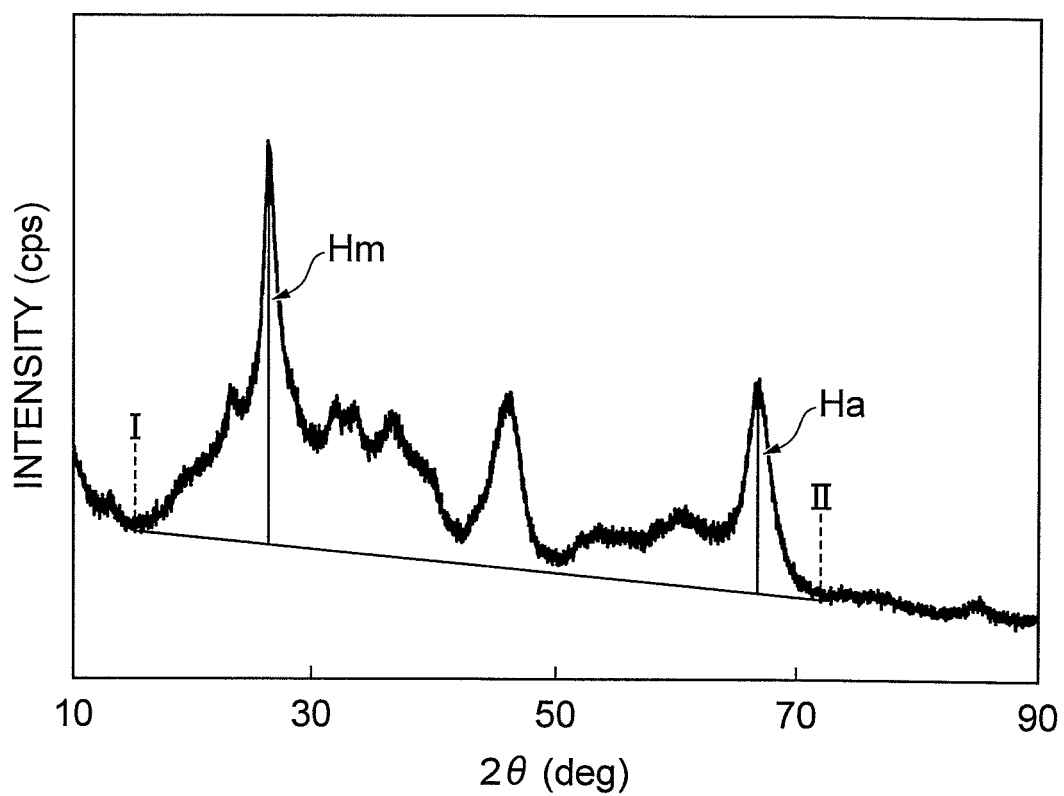
FIG. 1 is a drawing for explaining how to determine the presence or absence of a composite oxide.

Hereinafter, preferred embodiments of the present invention will be described below in detail.

(Hydrotreatment Catalyst)

An unused hydrotreatment catalyst (hereinafter, referred to as "unused catalyst") corresponding to a regenerated hydrotreatment catalyst of the present invention includes at least one species selected from metals of Groups 8 to 10 of the Periodic Table, and molybdenum (hereinafter, these are collectively referred to as "active metal"). Iron, cobalt or nickel is preferable as the metal of Groups 8 to 10 of the Periodic Table; cobalt or nickel is more preferable; and cobalt is especially preferable. The metal of Groups 8 to 10 of the Periodic Table and molybdenum may be respectively used alone, or used in combination of at least two species thereof. Specifically, molybdenum-cobalt, molybdenum-nickel, molybdenum-cobalt-nickel, and the like may be preferably used as the combination of the metals. The Periodic Table described herein is the long-form periodic table defined by the IUPAC (International Union of Pure and Applied Chemistry).

The unused catalyst is a catalyst in which the active metal is supported on an inorganic carrier containing aluminum oxide. Preferred examples of the inorganic carrier containing aluminum oxide may include alumina, alumina-silica, alumina-boria, alumina-titania, alumina-zirconia, alumina-magnesia, alumina-silica-zirconia, alumina-silica-titania, and a carrier obtained by adding, into alumina, a porous inorganic compound of various types of clay minerals such as zeolite, sepiolite and montmorillonite. Among these examples, alumina is particularly preferable.

The unused catalyst is preferably obtained by supporting 10 to 30 mass % of molybdenum as an oxide and 1 to 7 mass % of at least one species (for example, cobalt and/or nickel) selected from the metals of Groups 8 to 10 of the Periodic Table as an oxide, on an inorganic carrier, based on a total mass of the catalyst.

Although a precursor of active metal species used in supporting the active metal on the inorganic carrier is not specifically limited, an inorganic salt, an organic metal compound, or the like of the metal is used as the precursor, and a water-soluble inorganic salt is preferably used as the precursor. A supporting process is preferably performed using a solution, preferably aqueous solution, of the active metal precursor. Preferably, the supporting process adopts publicly-known methods such as dipping, impregnation, and co-precipitation.

The carrier on which the active metal precursor is supported is calcined preferably in the presence of oxygen after being dried, and it is preferable that the active metal species is first made into an oxide. Furthermore, before petroleum fractions are hydrotreated, a process of making the active metal into a sulfide through a sulfiding treatment called presulfiding is preferably performed.

(Hydrotreatment Process)

In a hydrotreatment process of petroleum fractions, a catalyst filled into a facility is preferably subjected to a presulfiding treatment prior to a hydrotreatment reaction using a sulfur compound to thereby make an active metal species into a metal sulfide.

Although the presulfiding conditions are not specifically limited, the presulfiding treatment is preferably performed in such a manner that a sulfur compound is added to an oil feed stock used for hydrotreatment of petroleum fractions, and the resultant mixture is continuously brought into contact with the regenerated catalyst under conditions in which the temperature is in the range of 200 to 380° C., LHSV is 1 to 2 $h^{-1}$, the pressure is set equal to that of hydrotreatment, and the treatment times is 48 hours or more. The sulfur compound added to the oil feed stock is not specifically limited, but preferably includes dimethyl disulfide (DMDS), hydrogen sulfide and the like, and is preferably added in an amount of 1 mass % based on the mass of the oil feed stock.

The operating conditions for hydrotreatment of petroleum fractions are not specifically limited. Thus, a small quantity of the sulfur compound such as DMDS may be added to the oil feed stock for the purpose of allowing the active metal species of the catalyst to keep its sulfide state; however, it is desirable that the sulfur compound is not added particularly because the sulfur compound which has already been contained in the oil feed stock typically makes it possible to keep the sulfide state.

The hydrogen partial pressure at an inlet of a reactor in the hydrotreatment process is preferably 3 to 13 MPa, more preferably 3.5 to 12 MPa, and particularly preferably 4 to 11 MPa. If the hydrogen partial pressure is less than 3 MPa, coke is more actively produced on the catalyst, and the life of the catalyst tends to be shortened. On the contrary, if the hydrogen partial pressure exceeds 13 MPa, the construction cost for a reactor or peripheral facilities may be increased and is thus economically infeasible.

The hydrotreatment process may be performed under the conditions in which LHSV is in the range of preferably 0.05 to 5 $h^{-1}$, more preferably 0.1 to 4.5 $h^{-1}$, and particularly preferably 0.2 to 4 $h^{-1}$. If LHSV is less than 0.05 $h^{-1}$, the construction cost for a reactor becomes too high and is therefore economically infeasible. On the contrary, if LHSV is greater than 5 $h^{-1}$, an oil feed stock may not be sufficiently hydrotreated.

The hydrogenation reaction temperature in the hydrotreatment process is preferably 200° C. to 410° C., more preferably 220° C. to 400° C., and particularly preferably 250° C. to 395° C. If the reaction temperature is less than 200° C., an oil feed stock tends to be insufficiently hydrotreated. If the reaction temperature is higher than 410° C., it is undesirable because the yield of a target refined oil is decreased due to an increase in the amount of by-produced gas.

The hydrotreatment process may be performed under the conditions in which a hydrogen/oil ratio is in the range of 100 to 8,000 SCF/BBL, more preferably 120 to 7,000 SCF/BBL, and particularly preferably 150 to 6,000 SCF/BBL. If the hydrogen/oil ratio is less than 100 SCF/BBL, coke is produced on the catalyst at an outlet of the reactor, thus shortening catalyst life. In contrast, if the hydrogen/oil ratio exceeds 8,000 SCF/BBL, the construction cost for a recycle compressor becomes too high, and is thus economically infeasible.

Although the reaction type in the hydrotreatment process is not specifically limited, it may be typically selected from various types of processes such as a fixed bed and a moving bed process, and particularly, the fixed bed process is preferable. Also, the reactor preferably has the shape of a tower.

The oil feed stock used for hydrotreatment of petroleum fractions may have a distillation temperature (boiling point) measured by a distillation test being in the range of preferably 130 to 700° C., more preferably 140 to 680° C., and particularly preferably 150 to 660° C. If the oil feed stock having the distillation temperature lower than 130° C. is used, the hydrotreatment reaction is carried out in a gaseous phase, and the catalyst tends to not exhibit its performance sufficiently. On the contrary, if the oil feed stock having the distillation temperature higher than 700° C. is used, the content of toxic substances such as heavy metals contained in the oil feed stock with respect to the catalyst becomes great, reducing the life of the catalyst significantly. Although other properties of petroleum fractions used as the oil feed stock are not specifically limited, representative properties are as follows: density at 15° C. is in the range of 0.8200 to 0.9700 g/cm$^3$; and sulfur content is in the range of 1.0 to 4.0 mass %.

Sulfur content means a content of sulfur which is measured according to "6. Energy-dispersive X-ray fluorescence Metod" of "Crude Oil and Petroleum Products—Determination of Sulfur Content" defined in JIS K 2541-1992. Distillation test means a test carried out according to "6. Determination of Distillation Characteristics at Reduced Pressure" of "Petroleum Products—Determination of Distillation Characteristics" defined in JIS K 2254. Density at 15° C. means a density measured according to "5. Oscillating Type Density Test Method" of "Crude Petroleum and Petroleum Products—Determination of Density and Petroleum Measurement Tables based on a reference temperature (15° C.)" defined in JIS K 2249.

(Regeneration Process)

The facility for performing regeneration to produce a regenerated catalyst is not specifically limited, but the regeneration is preferably performed in another facility differing from the hydrotreatment facility for petroleum fractions. That is, the regeneration is not performed in a state in which the catalyst is still packed inside a reactor of the hydrotreatment facility for petroleum fractions, but the regeneration is preferably performed in such a manner that the catalyst is removed from the reactor, the removed catalyst is then transferred to a regeneration facility, and the regeneration is then carried out in the regeneration facility.

The method of regenerating the spent catalyst is not specifically limited, but preferably includes processes in the order of a process of removing pulverized catalyst from the spent catalyst or fillers other than the catalyst if necessary by using a sieve, a process (deoiling process) of removing oil adhered to the spent catalyst, and a process (regeneration process) of removing coke, sulfur components, and the like which are deposited on the spent catalyst.

Among these processes, the deoiling process preferably adopts a method of volatilizing oil components by heating the spent catalyst at a temperature of 200 to 400° C. in a substantially oxygen-free atmosphere—for example, a nitrogen atmosphere. Also, the deoiling process may be performed using a method of cleaning oil components in light hydrocarbons or a method of removing oil components by steaming.

The regeneration process preferably adopts a method of oxidizing and removing deposited coke, sulfur components, and the like, by heating the spent catalyst at a temperature of 250 to 700° C., preferably 320 to 550° C., more preferably 330 to 450° C., and particularly preferably 340 to 400° C. in an atmosphere in which molecular oxygen is present—for example, in the air, and especially in the flow of air. When the heating temperature is lower than the lower limit temperature, the removal of substances, such as coke and sulfur components which deteriorated the catalytic activity, tend not to be effectively performed, a decrease in a peak intensity of Mo—S bond of molybdenum sulfide tend to be small, and a ratio of molybdenum oxide tend to be small. On the contrary, when the heating temperature is higher than the upper limit temperature, the activity of a regenerated catalyst obtained tends to be lowered because an active metal in the catalyst forms a composite metal oxide and causes agglomeration.

Furthermore, the temperature of the regeneration process preferably falls within a predetermined temperature range as calculated below in addition to the above-described temperature range.

That is, the predetermined temperature is preferably with the range of T1−30° C. to T2+30° C., wherein T1 and T2 are determined by subjecting the spent hydrotreatment catalyst to differential thermal analysis, converting differential calories observed in a measuring temperature range of 100° C. to 600° C. into differences in electromotive force, then differentiating the differences in electromotive force twice by temperature to obtain the smallest extreme value and the second smallest extreme value, and taking the temperature corresponding to the extreme value located in the lower-temperature range as T1 and the temperature corresponding to the extreme value located in the higher-temperature range as T2. By setting the regeneration temperature to the predetermined temperature range above, it is easy to convert the active metal in a sulfide state into an oxide state by use of the spent catalyst, and it is also possible to prevent the decrease in activity of the regenerated catalyst to a high degree, which may be caused by the complete removal of coke deposited on the catalyst through combustion.

Furthermore, the lower limit of the temperature range is preferably T1−20° C. or higher, and particularly preferably T1−10° C. or higher, and the upper limit of the temperature range is preferably T2+20° C. or lower, and particularly preferably T2+10° C. or lower.

The regeneration time is preferably 0.5 hours or longer, more preferably 2 hours or longer, further more preferably 2.5 hours or longer, and particularly preferably 3 hours or longer. If the regeneration time is less than 0.5 hours, substances which deteriorated the catalyst activity, e.g., coke, sulfur substances, and the like tend not to be effectively removed.

(Regenerated Catalyst)

Based on the mass of the regenerated catalyst, the lower limit of a residual carbon content in the regenerated catalyst obtained through the regeneration process is preferably 0.15 mass % or higher, more preferably 0.4 mass % or higher, and particularly preferably 0.5 mass % or higher; and the upper limit of the residual carbon content is preferably 3.0 mass % or less, more preferably 2.5 mass % or less, and particularly preferably 2.0 mass % or less. If the residual carbon content is less than 0.15 mass %, the catalyst undergoes a thermal history during the regeneration process to cause active metals to be agglomerated, and thus, the activity of the regenerated catalyst tends to be lowered. In contrast, if the residual carbon content is greater than 3.0 mass %, the carbon blocks active sites of the catalyst and therefore the activity of the regenerated catalyst tends to be lowered. "Residual carbon" described herein is carbon (coke) remaining in the regenerated catalyst after regenerating the spent hydrotreatment catalyst, and the residual carbon content in the regenerated hydrotreatment catalyst was measured according to "Coal and Coke-Mechanical Methods for Ultimate Analysis" defined in JIS M 8819.

In a spectrum obtained by subjecting the regenerated catalyst to an X-ray diffraction analysis, a peak intensity derived from a molybdenum composite metal oxide, which includes molybdenum and at least one species selected from metals of Group 8 to 10 of the Periodic Table, has a lower limit of preferably 0.60 or higher, more preferably 0.70 or higher, and particularly preferably 0.75 or higher, and has an upper limit of preferably 1.10 or lower, more preferably 0.90 or lower, and particularly preferably 0.85 or lower, with respect to the intensity of a base peak. If the peak intensity is less than 0.60, it is undesirable because the oxidation of the regenerated catalyst is insufficient to reduce the activity of the regenerated catalyst; and, if the peak intensity is greater than 1.10, it is also undesirable because molybdenum composite oxides agglomerate to reduce the activity of the regenerated catalyst.

Furthermore, in a radial distribution curve obtained from an EXAFS (Extended X-ray Absorption Fine Structure) spectrum obtained by subjecting the regenerated catalyst to an XAFS analysis, the peak intensity of Mo—S bond derived from residual sulfur has a lower limit of 0.10 or higher, preferably 0.12 or higher, and more preferably 0.15 or higher, and has an upper limit of 0.60 or lower, and preferably 0.50 or lower with respect to the intensity of the base peak. If the bond strength is less than 0.10, it is undesirable because the structure of the molybdenum oxide is changed to reduce the activity of the regenerated catalyst; and if the bond strength is greater than 0.60, it is also undesirable because sulfide compounds of molybdenum agglomerate to reduce the activity of the regenerated catalyst.

A ratio of $MoO_3$ which is obtained by analyzing the spectrum of an X-ray absorption near-edge structure region obtained by subjecting the regenerated catalyst to the XAFS analysis has a lower limit of 77% or higher, preferably 80% or higher, and more preferably 85% or higher, and has an upper limit of 99% or lower, and preferably 95% or lower. If the ratio of $MoO_3$ is less than 77%, it is undesirable because sulfide compounds of molybdenum agglomerate to reduce the activity of the regenerated catalyst; and if the ratio exceeds 99%, it is also undesirable because the structure of the molybdenum oxide is changed to reduce the activity of the regenerated catalyst.

(Method for Assessing Regenerated Catalyst)

Hereinafter, a method for assessing a regenerated catalyst will be described with reference to FIGS. 1 to 4.

FIG. 1 is a result obtained by subjecting a sample to X-Ray Diffraction (XRD) analysis.

In the X-ray diffraction patterns, by focusing on an XRD peak of $2\theta=26.5\pm2°$ attributed to a molybdenum composite metal oxide which is assumed from the active metal species contained in the catalyst obtained through the regeneration process, the presence or absence of the composite metal oxides is determined from a ratio of the peak intensity (CPS: Counts Per Secound) to the intensity of a base peak of $2\theta=66.8\pm2°$.

The determination of the presence or absence of the peaks is preferably performed according to the following criteria. That is, from the XRD patterns of the regenerated catalyst, when a maximum intensity point of $Al_2O_3$ of $2\theta=66.8\pm2°$ as a base peak is denoted as Ha and a maximum intensity point of $2\theta=26.5\pm2°$ as a peak derived from the composite metal oxide is denoted as Hm, a peak intensity of the molybdenum composite metal oxide with respect to the intensity of the base peak is a value of Hm/Ha, wherein a baseline is taken as a straight line obtained by connecting two points of a minimum intensity point I in the range of $2\theta=13$ to $16°$, and a minimum intensity point II in the range of $2\theta=69$ to $73°$.

Typical conditions of XRD analysis are as follows.

Figure 2:
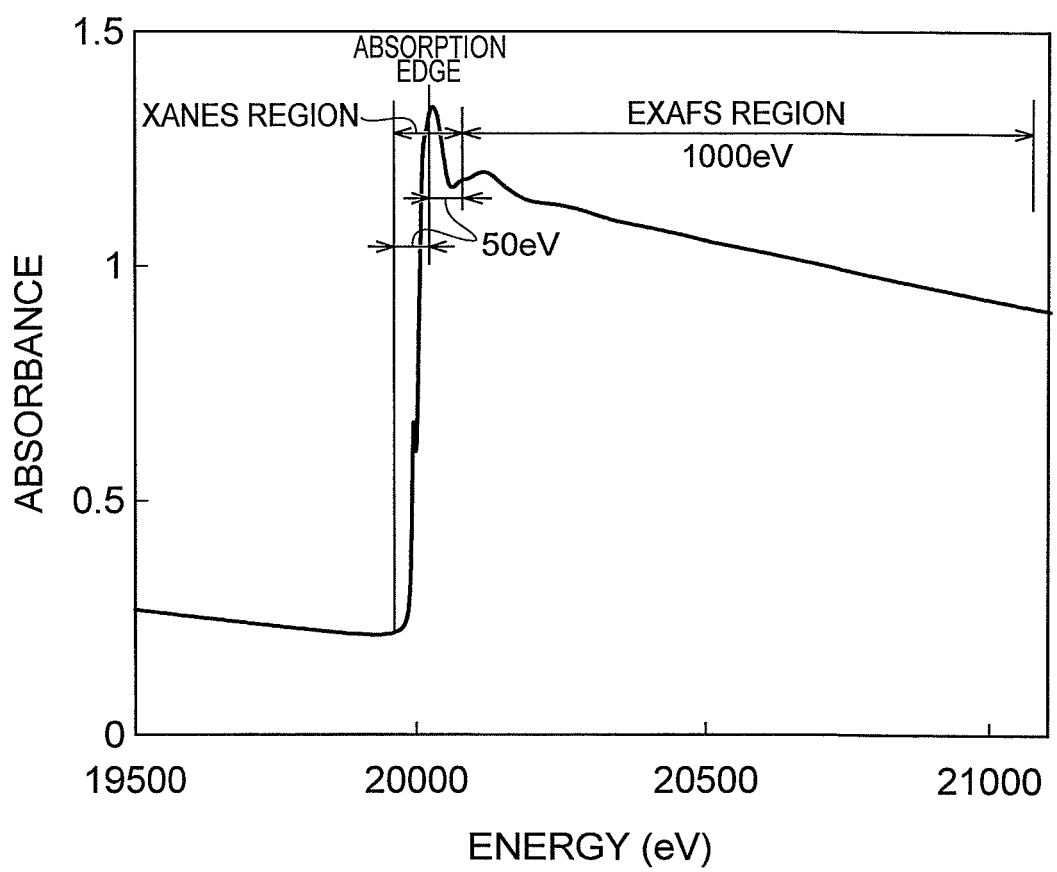
FIG. 2 is a drawing for explaining an XAFS analysis method.

X-ray source: CuKα
Divergence slit: ½°
Receiving slit: 0.15 mm
Scattering slit: ½°
$2\theta$: 10 to 90°
Step width: 0.02°
Tube voltage: 50 kV
Tube current: 200 mA
Use of monochromator
Scanning mode: Continuous scanning
Scanning speed: 1°/min FIG. 2 is a result obtained by subjecting a sample to X-ray Absorption Fine Structure (XAFS) analysis.

Figure 3:
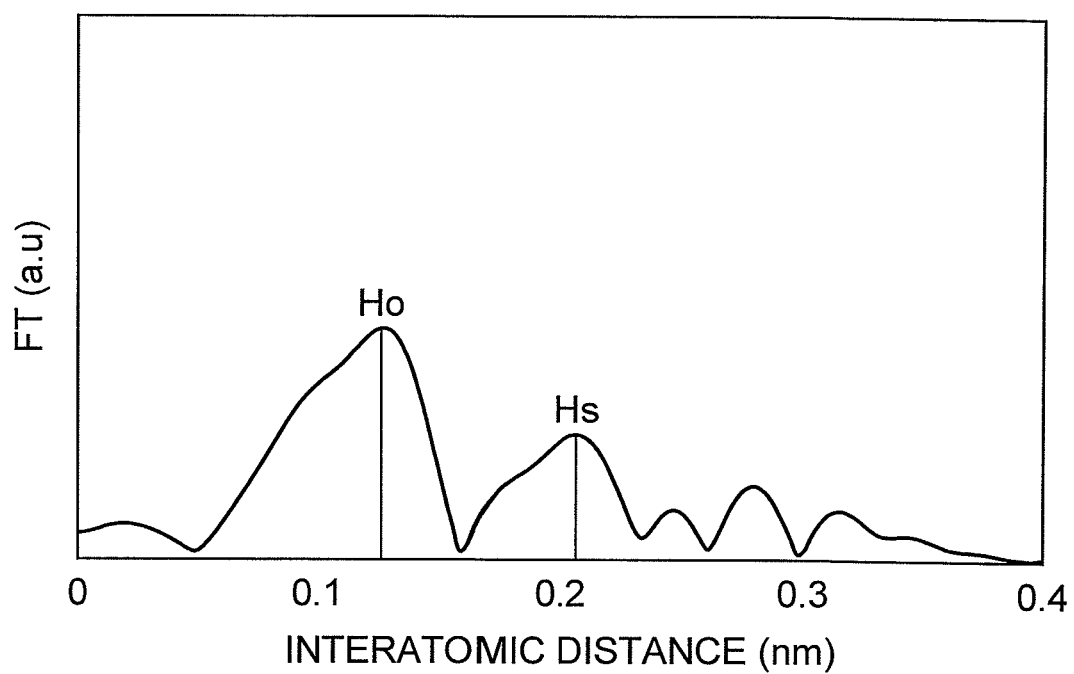
FIG. 3 is a drawing for explaining how to determine a Mo—S bond strength.

In this XAFS spectrum, an Extended X-ray Absorption Fine Structure (EXAFS) region of the catalyst obtained through the regeneration process is a region having a higher energy level than a region (absorption edge) where an X-ray absorption rate is dramatically changed against the energy of irradiated X-rays, and the region is Fourier transformed to obtain an EXAFS radial distribution curve shown in FIG. 3. From the EXAFS radial distribution curve, information regarding a peripheral structure of an atom to be measured can be obtained.

The XAFS analysis is a method of analyzing a structure of an analyte by means of an absorption spectrum in which an X-ray absorption coefficient of the analyte is plotted against X-ray energy, wherein the analyte is irradiated with X-rays included in synchrotron radiation generated from an electron accelerator or X-rays corresponding thereto after changing the energy of the X-rays.

In the EXAFS radial distribution curve shown in FIG. 3, XAFS measurement is carried out by focusing on molybdenum (Mo K absorption edge) of active metals included in the regenerated catalyst. In the radial distribution curve obtained through Fourier transformation of the EXAFS region of the obtained spectrum, by focusing on a peak intensity of Mo—S bond of an interatomic distance of 0.20 nm±0.01 which is attributed to a bond of a molybdenum atom-sulfur atom derived from residual sulfur, the peak intensity of Mo—S bond is determined from a ratio of the peak intensity to the intensity of the base peak of an interatomic distance of 0.13 nm±0.01. The determination of the peak intensity is performed preferably according to the following criteria. That is, the EXAFS radial distribution curve is obtained by extracting an EXAFS region using an XAFS analysis software, e.g., REX2000 (made by Rigaku), from the spectrum of the regenerated hydrotreatment catalyst obtained through XAFS measurement, and then performing Fourier transformation.

In this EXAFS radial distribution curve, when the peak derived from an Mo—S bond which is attributed to residual sulfur components is denoted as a maximum intensity point Hs of the interatomic distance of 0.20 nm±0.01, and the base peak is denoted as a maximum intensity point Ho of the interatomic distance of 0.13 nm±0.01 derived from an Mo—O bond, a value of Hs/Ho is the peak intensity of the Mo—S bond to the intensity of the base peak.

Also, the intensity of a peak in the radial distribution curve obtained from the Extended X-ray Absorption Fine Structure region of the spectrum acquired by performing the XAFS analysis is set as the height of the peak. Also, details of data analysis such as a method of taking a baseline for calculating the height of the peak were performed using an integrated XAFS analysis software, REX2000 (made by Rigaku), according to methods disclosed in "57-61 pp., X-ray absorption spectroscopy-XAFS and its applications-edited by Toshiaki OTA and published by IPC (2002)".

The XAFS analysis of the regenerated catalyst of the present invention is carried out by the method below.

X-ray source: Continuous X-ray
Spectral crystal: Si(311)

Beam size: 1 mm×2 mm
Detector: Ionization chamber
Measurement atmosphere: air
Dwell time: 1 sec
Measurement range: Mo K absorption edge (19974.0 to 20074.0 eV)
Data analysis (Fourier transformation) program: REX2000 (made by Rigaku)

Figure 4:
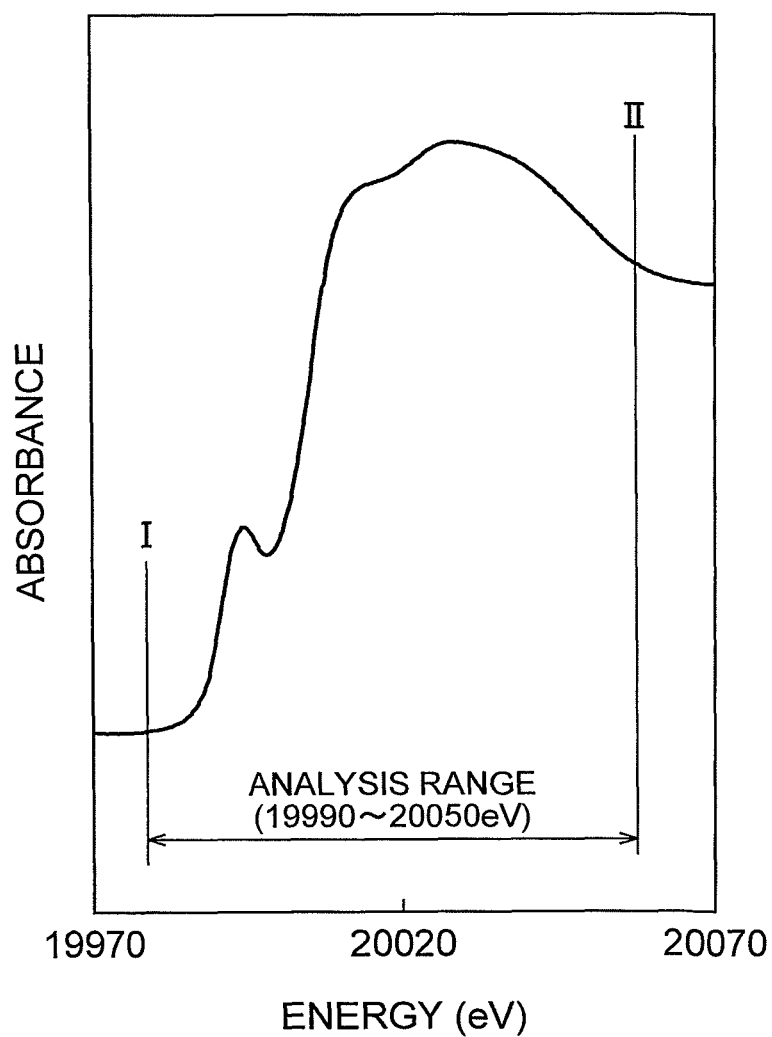
FIG. 4 is a drawing for explaining how to determine a ratio of $MoO_3$.

In the XAFS spectrum of FIG. 2, an X-ray Absorption Near-Edge Structure (XANES) region of the regenerated catalyst obtained through the regeneration process is a region (absorption edge) where an X-ray absorption coefficient is dramatically changed against the irradiated X-ray energy, and an XANES spectrum shown in FIG. 4 is obtained by analyzing the spectrum of this region. From the XANES spectrum, information regarding the chemical status of an atom to be measured can be obtained.

In the XANES spectrum shown in FIG. 4, XAFS measurement is carried out by focusing on molybdenum (Mo K absorption edge) of active metals included in the regenerated catalyst. In the XANES region spectrum obtained, a ratio of $MoO_3$ is determined by pattern fitting using reference samples of $MoO_3$ and $MoS_2$ measured under the same conditions. The determination of the spectrum is performed preferably according to the following criteria. That is, a ratio of $MoO_3$ is a ratio of $MoO_3$ to the sum of $MoO_3$ and $MoS_2$ when the XANES spectrum is extracted from the spectrum of the regenerated hydrotreatment catalyst obtained in the XAFS measurement by using an XAFS analysis software of REX2000 (made by Rigaku), and then the pattern-fitting of the analysis software is carried out in a range of 19,990 eV to 20,050 eV by using $MoO_3$ and $MoS_2$ measured under the same conditions as the regenerated catalyst.

Also, the spectrum obtained by performing the XAFS analysis is analyzed using an integrated XAFS analysis software of REX2000 (made by Rigaku), and details of data analysis such as a method of taking a baseline for calculating the ratio of molybdenum oxide were performed using the integrated XAFS analysis software of REX2000 (made by Rigaku), according to methods disclosed in "78-79 pp., X-ray absorption spectroscopy-XAFS and its applications-edited by Toshiaki OTA and published by IPC (2002)" and instructions disclosed in "51-59 pp., Instruction manual of the integrated XAFS analysis software of REX2000 (made by Rigaku)".

The XAFS analysis of the regenerated catalyst of the present invention will be omitted herein because it is carried out under the same conditions as the above-described analysis conditions.

Since the activity of an unused catalyst (new catalyst) varies by catalyst manufacturer or manufacturing unit, it is considered appropriate that the activity of the regenerated catalyst regenerated from the hydrotreatment catalyst after it is used should be assessed through the relative value to the activity of the unused catalyst corresponding thereto. Herein, the activity of the regenerated catalyst is assessed through specific activity defined in the following equation.

Specific activity=Desulfurization rate constant of regenerated catalyst/Desulfurization rate constant of unused catalyst (How to Use Regenerated Catalyst)
The regenerated catalyst of the present invention may be used alone as a catalyst for the hydrotreatment process of the petroleum fraction, or used by being stacked with an unused catalyst. In the cases of using the regenerated catalyst stacked with an unused catalyst, the ratio of the regenerated catalyst is not specifically limited, but is preferably 80 or higher (mass ratio), and more preferably 120 or higher (mass ratio) with respect to 100 of the unused catalyst in terms of reducing the amount of waste catalyst and ease of catalyst separation during the replacement of catalysts.

EXAMPLE

Hereinafter, the present invention will be more fully described with reference to Examples and Comparative Examples, but is not limited whatsoever by these Examples presented below.

Example 1

Regenerated Catalyst

A spent hydrotreatment catalyst which has been used for 2 years in a hydrotreating facility for kerosene was prepared as shown in Table 1, wherein the catalyst was obtained by supporting molybdenum and cobalt as active metals on an alumina carrier. The spent hydrotreatment catalyst was weighted out 5 mg onto a pan made of platinum, then set in a differential thermal analyzer (Thermo Plus 2 series/TG8110, made by Rigaku Co., Ltd.), and a differential thermal analysis was carried out at an air flow rate of 100 ml/min by raising the temperature by 10° C./min from room temperature to 700° C. Thereafter, T1 and T2 were calculated from the results of the differential thermal analysis according to the aforesaid method, resulting in T1=250° C. and T2=400° C. Here, the spent hydrotreatment catalyst was regenerated for 4 hours at 350° C. (T1+100° C., T2−50° C.) as shown in Table 1, thereby obtaining a regenerated catalyst 1.

(Analysis of Residual Carbon in Regenerated Catalyst)
The measurement of a residual carbon content was performed on the regenerated catalyst 1. The details of the analysis operation are the same as described above, and the results are shown in Table 1.

(XRD Analysis of Regenerated Catalyst)
A small quantity of the regenerated catalyst 1 was powdered and an XRD analysis was then carried out. The details of the analysis operation are the same as described above. From the analysis results, a ratio of a diffraction peak intensity (Hm) of 2θ=about 26.5° which was attributed to a composite oxide $CoMoO_4$, of the active metals molybdenum and cobalt, with respect to a diffraction peak intensity (Ha) of 2θ=about 66.8° which was attributed to alumina, was calculated and the calculated results are shown in Table 1.

(Analysis of EXAFS Region by Subjecting Regenerated Catalyst to XAFS Analysis)
After small quantities of the regenerated catalyst 1 and a spent catalyst corresponding to the regenerated catalyst 1 were respectively powdered, the powdered catalysts were tableted to form pellet-like objects and the XAFS analysis was then carried out. Details of the analysis procedure are the same as described above. Hs and Ho were respectively calculated from the radial distribution curve obtained, and the calculated results of a peak intensity ratio (Hs/Ho) are shown in Table 1.

(Analysis of XANES Region by Subjecting Regenerated Catalyst to XAFS Analysis)
After small quantities of the regenerated catalyst 1, an unused catalyst corresponding to the regenerated catalyst 1, and a spent catalyst corresponding to the regenerated catalyst 1 were respectively powdered, the powdered catalysts were tableted to form pellet-like objects and the XAFS analysis was then carried out. Details of the analysis procedure are the same as described above. A ratio of $MoO_3$ was calculated by synthesizing the spectra of $MoO_3$ and $MoS_2$ from the absorption edge spectrum obtained from the regenerated catalyst 1, and the calculated results are shown in Table 1.

(Hydrotreatment Reaction)

The regenerated catalyst 1 obtained through the regeneration was filled into a fixed-bed continuous-flow reactor to subject the catalyst to presulfiding treatment. 1 mass % of DMDS was added to a fraction corresponding to kerosene having the properties specified in Table 1 based on the mass of the fraction, and was continuously supplied to the catalyst for 48 hours. Afterwards, a hydrotreatment reaction was carried out under the conditions shown in Table 1 by using a fraction corresponding to kerosene having properties specified in Table 1 as an oil feed stock. The desulfurization rate constant was calculated from the content of a sulfur component in the oil produced. Also, the desulfurization rate constant was calculated by carrying out the same reaction using an unused catalyst corresponding to the regenerated catalyst 1, and then the specific activity of the regenerated catalyst 1 was calculated from the desulfurization rate constant. The results are shown in Table 1.

Example 2

Regenerated Catalyst

A spent hydrotreatment catalyst which has been used for 2 years in a hydrotreating facility for gas oil was prepared as shown in Table 1, wherein the catalyst was obtained by supporting molybdenum and cobalt as active metals on an alumina carrier, and a differential thermal analysis was carried out in the same manner as Example 1 to calculate T1 and T2, resulting in T1=260° C. and T2=410° C. Here, the spent hydrotreatment catalyst was regenerated for 4 hours at 300° C. (T1+40° C., T2−110° C.) as shown in Table 1, thereby obtaining a regenerated catalyst 2.

(Analysis of Residual Carbon in Regenerated Catalyst)

A measurement of residual carbon content was performed on the regenerated catalyst 2. The details of the analysis operation are the same as described above, and the results are shown in Table 1.

(XRD Analysis of Regenerated Catalyst)

A small quantity of the regenerated catalyst 2 was powdered and an XRD analysis was then carried out. The details of the analysis operation are the same as described above. From the analysis results, a ratio of a diffraction peak intensity (Hm) of 2θ=about 26.5° which was attributed to a composite oxide $CoMoO_4$, made of the active metals molybdenum and cobalt, with respect to a diffraction peak intensity (Ha) of 2θ=about 66.8° which was attributed to alumina, was calculated and the calculated results are shown in Table 1.

(Analysis of EXAFS Region by Subjecting Regenerated Catalyst to XAFS Analysis)

After small quantities of the regenerated catalyst 1 and a spent catalyst corresponding to the regenerated catalyst 1 were respectively powdered, the powdered catalysts were tableted to form pellet-like objects and the XAFS analysis was then carried out. The details of the analysis procedure are the same as described above. Hs and Ho were respectively calculated from the radial distribution curve obtained, and the calculated results of a peak intensity ratio (Hs/Ho) are shown in Table 1.

(Analysis of XANES Region by Subjecting Regenerated Catalyst to XAFS Analysis)

After small quantities of the regenerated catalyst 2, an unused catalyst corresponding to the regenerated catalyst 2, and a spent catalyst corresponding to the regenerated catalyst 2 were respectively powdered, the powdered catalysts were tableted to form pellet-like objects and the XAFS analysis was then carried out. The details of an analysis procedure are the same as described above. A ratio of $MoO_3$ was calculated by synthesizing the spectra of $MoO_3$ and $MoS_2$ from the absorption edge spectrum obtained from the regenerated catalyst 2, and the calculated results are shown in Table 1.

(Hydrotreatment Reaction)

A hydrotreatment reaction was carried out in the same manner as Example 1 except for the conditions as shown in Table 1 by using a fraction, corresponding to gas oil having properties specified in Table 1, as an oil feed stock. The results of the specific activity are shown in Table 1.

Example 3

Regenerated Catalyst

A spent hydrotreatment catalyst which has been used for 1 year in a hydrotreating facility of vacuum gas oil was prepared as shown in Table 1, wherein the catalyst was obtained by supporting molybdenum and cobalt as active metals on an alumina carrier, and a differential thermal analysis was carried out in the same manner as Example 1 to calculate T1 and T2, resulting in T1=10° C. and T2=460° C. Here, the spent hydrotreatment catalyst was regenerated for 0.5 hours at 450° C. (T1+140° C., T2−10° C.) as shown in Table 1, thereby obtaining a regenerated catalyst 3.

(Analysis of Residual Carbon in Regenerated Catalyst)

The measurement of residual carbon content was performed on the regenerated catalyst 3. The details of the analysis operation are the same as described above, and the results are shown in Table 1.

(XRD Analysis of Regenerated Catalyst)

A small quantity of the regenerated catalyst 3 was powdered and an XRD analysis was then carried out. The details of the analysis operation are the same as described above. From the analysis results, a ratio of a diffraction peak intensity (Hm) of 2θ=about 26.5° which was attributed to a composite oxide $CoMoO_4$, made of the active metals molybdenum and cobalt, with respect to a diffraction peak intensity (Ha) of 2θ=about 66.8° which was attributed to alumina, was calculated and the calculated results are shown in Table 1.

(Analysis of EXAFS Region by Subjecting Regenerated Catalyst to XAFS Analysis)

After small quantities of the regenerated catalyst 3 and a spent catalyst corresponding to the regenerated catalyst 3 were respectively powdered, the powdered catalysts were tableted to form pellet-like objects and the XAFS analysis was then carried out. The details of the analysis procedure are the same as described above. Hs and Ho were respectively calculated from the radial distribution curve obtained, and the calculated results of a peak intensity ratio (Hs/Ho) are shown in Table 1.

(Analysis of XANES Region by Subjecting Regenerated Catalyst to XAFS Analysis)

After small quantities of the regenerated catalyst 3, an unused catalyst corresponding to the regenerated catalyst 3, and a spent catalyst corresponding to the regenerated catalyst 3 were respectively powdered, the powdered catalysts were tableted to form pellet-like objects and the XAFS analysis was then carried out. The details of the analysis procedure are the same as described above. A ratio of $MoO_3$ was calculated by synthesizing spectra of $MoO_3$ and $MoS_2$ from the absorption edge spectrum obtained from the regenerated catalyst 3, and the calculated results are shown in Table 1.

(Hydrotreatment Reaction)

A hydrotreatment reaction was carried out in the same manner as Example 1 except for the conditions as shown in Table 1 by using a fraction, corresponding to vacuum gas oil having properties specified in Table 1, as an oil feed stock. The results of the specific activity are shown in Table 1.

Example 4

Regenerated Catalyst

A spent hydrotreatment catalyst which has been used for 1 year in a hydrotreating facility for gas oil was prepared as shown in Table 1, wherein the catalyst was obtained by supporting molybdenum and cobalt as active metals on an alumina carrier, and a differential thermal analysis was carried out in the same manner as Example 1 to calculate T1 and T2, resulting in T1=360° C. and T2=390° C. Here, the spent hydrotreatment catalyst was regenerated for 4 hours at 400° C. (T1+40° C., T2+10° C.) as shown in Table 1, thereby obtaining a regenerated catalyst 4.

(Analysis of Residual Carbon in Regenerated Catalyst)
The measurement of residual carbon content was performed on the regenerated catalyst 4. The details of the analysis operation are the same as described above, and the results are shown in Table 1.

(XRD Analysis of Regenerated Catalyst)
A small quantity of the regenerated catalyst 4 was powdered and an XRD analysis was then carried out. The details of the analysis operation are the same as described above. From the analysis results, a ratio of a diffraction peak intensity (Hm) of 2θ=about 26.5° which was attributed to a composite oxide $CoMoO_4$, made of the active metals molybdenum and cobalt, with respect to a diffraction peak intensity (Ha) of 2θ=about 66.8° which was attributed to alumina, was calculated and the calculated results are shown in Table 1.

(Analysis of EXAFS Region by Subjecting Regenerated Catalyst to XAFS Analysis)
After small quantities of the regenerated catalyst 4 and a spent catalyst corresponding to the regenerated catalyst 4 were respectively powdered, the powdered catalysts were tabletted to form pellet-like objects and the XAFS analysis was then carried out. The details of the analysis procedure are the same as described above. Hs and Ho were respectively calculated from the radial distribution curve obtained, and the calculation results of a peak intensity ratio (Hs/Ho) are shown in Table 1.

(Analysis of XANES Region by Subjecting Regenerated Catalyst to XAFS Analysis)
After small quantities of the regenerated catalyst 4, an unused catalyst corresponding to the regenerated catalyst 4, and a spent catalyst corresponding to the regenerated catalyst 4 were respectively powdered, the powdered catalysts were tabletted to form pellet-like objects and the XAFS analysis was then carried out. The details of the analysis procedure are the same as described above. A ratio of $MoO_3$ was calculated by synthesizing the spectra of $MoO_3$ and $MoS_2$ from the absorption edge spectrum obtained from the regenerated catalyst 4, and the calculated results are shown in Table 1.

(Hydrotreatment Reaction)
A hydrotreatment reaction was carried out in the same manner as Example 1 except for the conditions as shown in Table 1 by using a fraction, corresponding to gas oil having properties specified in Table 1, as an oil feed stock. The results of the specific activity are shown in Table 1.

Comparative Example 1

Regenerated Catalyst

A spent hydrotreatment catalyst which has been used for 2 years in a hydrotreating facility for kerosene was prepared as shown in Table 1, wherein the catalyst was obtained by supporting molybdenum and cobalt as active metals on an alumina carrier, and a differential thermal analysis was carried out in the same manner as Example 1 to calculate T1 and T2, resulting in T1=250° C. and T2=310° C. Here, the spent hydrotreatment catalyst was regenerated for 10 hours at 350° C. (T1+100° C., T2+40° C.) as shown in Table 1, thereby obtaining a regenerated catalyst 5.

(Analysis of Residual Carbon in Regenerated Catalyst)
The measurement of residual carbon content was performed on the regenerated catalyst 5. The details of the analysis operation are the same as described above, and the results are shown in Table 1.

(XRD Analysis of Regenerated Catalyst)
A small quantity of the regenerated catalyst 5 was powdered and an XRD analysis was then carried out. The details of the analysis operation are the same as described above. From the analysis results, a ratio of a diffraction peak intensity (Hm) of 2θ=about 26.5° which was attributed to a composite oxide $CoMoO_4$, made of the active metals molybdenum and cobalt, with respect to a diffraction peak intensity (Ha) of 2θ=about 66.8° which was attributed to alumina, was calculated and the calculated results are shown in Table 1.

(Analysis of EXAFS Region by Subjecting Regenerated Catalyst to XAFS Analysis)
After small quantities of the regenerated catalyst 5 and a spent catalyst corresponding to the regenerated catalyst 5 were respectively powdered, the powdered catalysts were tabletted to form pellet-like objects and the XAFS analysis was then carried out. The details of the analysis procedure are the same as described above. Hs and Ho were respectively calculated from the radial distribution curve obtained, and the calculated results of a peak intensity ratio (Hs/Ho) are shown in Table 1.

(Analysis of XANES Region by Subjecting Regenerated Catalyst to XAFS Analysis)
After small quantities of the regenerated catalyst 5, an unused catalyst corresponding to the regenerated catalyst 5, and a spent catalyst corresponding to the regenerated catalyst 5 were respectively powdered, the powdered catalysts were tabletted to form pellet-like objects and the XAFS analysis was then carried out. The details of the analysis procedure are the same as described above. A ratio of $MoO_3$ was calculated by synthesizing the spectra of $MoO_3$ and $MoS_2$ from the absorption edge spectrum obtained from the regenerated catalyst 5, and the calculated results are shown in Table 1.

(Hydrotreatment Reaction)
A hydrotreatment reaction was carried out in the same manner as Example 1 except for the conditions as shown in Table 1 by using a fraction, corresponding to kerosene having properties specified in Table 1, as an oil feed stock. The results of the specific activity are shown in Table 1.

Comparative Example 2

Regenerated Catalyst

A spent hydrotreatment catalyst which has been used for 2 years in a hydrotreating facility for gas oil was prepared as shown in Table 1, wherein the catalyst was obtained by supporting molybdenum and cobalt as active metals on an alumina carrier, and a differential thermal analysis was carried out in the same manner as Example 1 to calculate T1 and T2, resulting in T1=310° C. and T2=410° C. Here, the spent hydrotreatment catalyst was regenerated for 5 hours at 200° C. (T1−110° C., T2−210° C.) as shown in Table 1, thereby obtaining a regenerated catalyst 6.

(Analysis of Residual Carbon in Regenerated Catalyst)
The measurement of residual carbon content was performed on the regenerated catalyst 6. The details of the analysis operation are the same as described above, and results are shown in Table 1.

(XRD Analysis of Regenerated Catalyst)
A small quantity of the regenerated catalyst 6 was powdered and an XRD analysis was then carried out. Details of the analysis operation are the same as described above. From the analysis results, a ratio of a diffraction peak intensity (Hm) of 2θ=about 26.5° which was attributed to a composite oxide $CoMoO_4$, made of the active metals molybdenum and cobalt, with respect to a diffraction peak intensity (Ha) of 2θ=about 66.8° which was attributed to alumina, was calculated and the calculated results are shown in Table 1.

(Analysis of EXAFS Region by Subjecting Regenerated Catalyst to XAFS Analysis)
After small quantities of the regenerated catalyst 6 and a spent catalyst corresponding to the regenerated catalyst 6 were respectively powdered, the powdered catalysts were tableted to form pellet-like objects and the XAFS analysis was then carried out. The details of the analysis procedure are the same as described above. Hs and Ho were respectively calculated from the radial distribution curve obtained, and the calculated results of a peak intensity ratio (Hs/Ho) are shown in Table 1.

(Analysis of XANES Region by Subjecting Regenerated Catalyst to XAFS Analysis)
After small quantities of the regenerated catalyst 6, an unused catalyst corresponding to the regenerated catalyst 6, and a spent catalyst corresponding to the regenerated catalyst 6 were respectively powdered, the powdered catalysts were tableted to form pellet-like objects and the XAFS analysis was then carried out. The details of the analysis procedure are the same as described above. A ratio of $MoO_3$ was calculated by synthesizing the spectra of $MoO_3$ and $MoS_2$ from the absorption edge spectrum obtained from the regenerated catalyst 6, and the calculated results are shown in Table 1.

(Hydrotreatment Reaction)
A hydrotreatment reaction was carried out in the same manner as Example 1 except for the conditions as shown in Table 1 by using a fraction, corresponding to gas oil having properties specified in Table 1, as an oil feed stock. The results of the specific activity are shown in Table 1.

Comparative Example 3

Regenerated Catalyst

A spent hydrotreatment catalyst which has been used for 1 year in a hydrotreating facility for vacuum gas oil was prepared as shown in Table 1, wherein the catalyst was obtained by supporting molybdenum and cobalt as active metals on an alumina carrier, and a differential thermal analysis was carried out in the same manner as Example 1 to calculate T1 and T2, resulting in T1=440° C. and T2=500° C. Here, the spent hydrotreatment catalyst was regenerated for 4 hours at 400° C. (T1−40° C., T2−100° C.) as shown in Table 1, thereby obtaining a regenerated catalyst 7.

(Analysis of Residual Carbon in Regenerated Catalyst)
The measurement of residual carbon content was performed on the regenerated catalyst 7. The details of the analysis operation are the same as described above, and results are shown in Table 1.

(XRD Analysis of Regenerated Catalyst)
A small quantity of the regenerated catalyst 7 was powdered and an XRD analysis was then carried out. The details of the analysis operation are the same as described above. From the analysis results, a ratio of a diffraction peak intensity (Hm) of 2θ=about 26.5° which was attributed to a composite oxide $CoMoO_4$, made of the active metals molybdenum and cobalt, with respect to a diffraction peak intensity (Ha) of 2θ=about 66.8° which was attributed to alumina, was calculated and the calculated results are shown in Table 1.

(Analysis of EXAFS Region by Subjecting Regenerated Catalyst to XAFS Analysis)
After small quantities of the regenerated catalyst 7 and a spent catalyst corresponding to the regenerated catalyst 7 were respectively powdered, the powdered catalysts were tableted to form pellet-like objects and the XAFS analysis was then carried out. The details of the analysis procedure are the same as described above. Hs and Ho were respectively calculated from the radial distribution curve obtained, and the calculated results of a peak intensity ratio (Hs/Ho) are shown in Table 1.

(Analysis of XANES Region by Subjecting Regenerated Catalyst to XAFS Analysis)
After small quantities of the regenerated catalyst 7, an unused catalyst corresponding to the regenerated catalyst 7, and a spent catalyst corresponding to the regenerated catalyst 7 were respectively powdered, the powdered catalysts were tableted to form pellet-like objects and the XAFS analysis was then carried out. The details of the analysis procedure are the same as described above. A ratio of $MoO_3$ was calculated by synthesizing the spectra of $MoO_3$ and $MoS_2$ from the absorption edge spectrum obtained from the regenerated catalyst 7, and the calculated results are shown in Table 1.

(Hydrotreatment Reaction)
A hydrotreatment reaction was carried out in the same manner as Example 1 except for the conditions as shown in Table 1 by using a fraction, corresponding to vacuum gas oil having properties specified in Table 1, as an oil feed stock. The results of the specific activity are shown in Table 1.

Comparative Example 4

Regenerated Catalyst

A spent hydrotreatment catalyst which has been used for 1 year in a hydrotreating facility for gas oil was prepared as shown in Table 1, wherein the catalyst was obtained by supporting molybdenum and cobalt as active metals on an alumina carrier, and a differential thermal analysis was carried out in the same manner as Example 1 to calculate T1 and T2, resulting in T1=310° C. and T2=410° C. Here, the spent hydrotreatment catalyst was regenerated for 4 hours at 500° C. (T1+190° C., T2+90° C.) as shown in Table 1, thereby obtaining a regenerated catalyst 8.

(Analysis of Residual Carbon in Regenerated Catalyst)
The measurement of residual carbon content was performed on the regenerated catalyst 8. The details of the analysis operation are the same as described above, and the results are shown in Table 1.

(XRD Analysis of Regenerated Catalyst)
A small quantity of the regenerated catalyst 8 was powdered and an XRD analysis was then carried out. The details of the analysis operation are the same as described above. From the analysis results, a ratio of a diffraction peak intensity (Hm) of 2θ=about 26.5° which was attributed to a composite oxide $CoMoO_4$, made of the active metals molybdenum and cobalt, with respect to a diffraction peak intensity (Ha) of 2θ=about 66.8° which was attributed to alumina, was calculated and the calculated results are shown in Table 1.

(Analysis of EXAFS Region by Subjecting Regenerated Catalyst to XAFS Analysis)

After small quantities of the regenerated catalyst 8 and a spent catalyst corresponding to the regenerated catalyst 8 were respectively powdered, the powdered catalysts were tableted to form pellet-like objects and the XAFS analysis was then carried out. The details of the analysis procedure are the same as described above. Hs and Ho were respectively calculated from the radial distribution curve obtained, and the calculated results of a peak intensity ratio (Hs/Ho) are shown in Table 1.

(Analysis of XANES Region by Subjecting Regenerated Catalyst to XAFS Analysis)

After small quantities of the regenerated catalyst 8, an unused catalyst corresponding to the regenerated catalyst 8, and a spent catalyst corresponding to the regenerated catalyst 8 were respectively powdered, the powdered catalysts were tableted to form pellet-like objects and the XAFS analysis was then carried out. The details of the analysis procedure are the same as described above. A ratio of $MoO_3$ was calculated by synthesizing the spectra of $MoO_3$ and $MoS_2$ from the absorption edge spectrum obtained from the regenerated catalyst 8, and the calculated results are shown in Table 1.

(Hydrotreatment Reaction)

A hydrotreatment reaction was carried out in the same manner as Example 1 except for the conditions as shown in Table 1 by using a fraction, corresponding to gas oil having properties specified in Table 1, as an oil feed stock. The results of the specific activity are shown in Table 1.

From the results of Table 1, it is found that as the residual carbon content, and the results of XRD analysis and XAFS analysis fall within an applicable range, the regenerated catalyst of the present invention has an activity of about 93% or more as a relative value to an activity of an unused catalyst (Examples 1 to 4). On the contrary, as illustrated in Comparative Examples 5 to 8, in any case where one of the analysis items deviates from the applicable range, the regenerated catalyst has an activity of about 90% or less as a relative value to an activity of an unused catalyst, and thus, the activity is significantly lowered.

The invention claimed is:

1. A regenerated hydrotreatment catalyst regenerated from a hydrotreatment catalyst for treating a petroleum fraction, the hydrotreatment catalyst being prepared by supporting molybdenum and at least one species selected from metals of Groups 8 to 10 of the Periodic Table on an inorganic carrier containing an aluminum oxide, wherein, a residual carbon content is in the range of 0.15 mass % to 3.0 mass %, the ratio of a peak intensity of a molybdenum composite metal oxide to an intensity of a base peak is in the range of 0.60 to 1.10 in an X-Ray diffraction spectrum, and the ratio of a peak intensity of a Mo—S bond derived from a residual sulfur peak to an intensity of a base peak is in the range of 0.10 to 0.60 in a radial distribution curve

TABLE 1

| | | Example | | | | Comparative Example | | | |
|---|---|---|---|---|---|---|---|---|---|
| | | 1 | 2 | 3 | 4 | 1 | 2 | 3 | 4 |
| Catalyst | Catalyst Name | Reg. Catalyst 1 | Reg. Catalyst 2 | Reg. Catalyst 3 | Reg. Catalyst 4 | Reg. Catalyst 5 | Reg. Catalyst 6 | Reg. Catalyst 7 | Reg. Catalyst 8 |
| | Hydrotreatment facility using catalyst | Kerosene treating facility | Gas oil treating facility | Vacuum gas oil treating facility | Gas oil treating facility | Kerosene treating facility | Gas oil treating facility | Vacuum gas oil treating facility | Gas oil treating facility |
| | Service life (years) | 2 | 2 | 1 | 1 | 2 | 2 | 1 | 1 |
| | Residual carbon content (mass %) | 1.5 | 1.8 | 1.0 | 0.2 | 0.10 | 4 | 0.10 | 0.08 |
| | Peak intensity ratio Hm/Ha of XRD | 0.83 | 0.85 | 1.09 | 0.95 | 0.80 | 0.59 | 1.43 | 1.75 |
| | Peak intensity ratio Hs/Ho of EXAFS radial distribution curve | 0.16 | 0.38 | 0.17 | 0.19 | 0.09 | 0.71 | 0.17 | 0.04 |
| | $MoO_3$ ratio (%) of XANES absorption edge spectrum | 93 | 87 | 90 | 98 | 94 | 70 | 99 | 100 |
| Regeneration Conditions | T1 (° C.) | 250 | 260 | 310 | 360 | 250 | 310 | 440 | 310 |
| | T2 (° C.) | 400 | 410 | 460 | 390 | 310 | 410 | 500 | 410 |
| | Temperature of regeneration process (° C.) | 350 (T1 + 100) (T2 − 50) | 300 (T1 + 40) (T2 − 110) | 450 (T1 + 140) (T2 − 10) | 400 (T1 + 40) (T2 + 10) | 350 (T1 + 100) (T2 + 40) | 200 (T1 − 110) (T2 − 210) | 400 (T1 − 40) (T2 − 100) | 500 (T1 + 190) (T2 + 90) |
| | Regeneration time (h) | 4 | 4 | 0.5 | 4 | 10 | 5 | 4 | 4 |
| Hydrotreatment Conditions | Oil feed stock — Name of Oil feed stock | Oil feed stock 1 | Oil feed stock 2 | Oil feed stock 3 | Oil feed stock 2 | Oil feed stock 1 | Oil feed stock 2 | Oil feed stock 3 | Oil feed stock 2 |
| | Density (kg/m³) | 799.4 | 851.6 | 923.6 | 851.6 | 799.4 | 851.6 | 923.6 | 851.6 |
| | Initial boiling point (° C.) | 152 | 231 | 274 | 231 | 152 | 231 | 274 | 231 |
| | Final boiling point (° C.) | 270 | 376 | 635 | 376 | 270 | 376 | 635 | 376 |
| | Sulfur component (mass %) | 0.25 | 1.18 | 2.16 | 1.18 | 0.25 | 1.18 | 2.16 | 1.18 |
| | Hydrogen partial pressure (MPa) | 3 | 6 | 6 | 6 | 3 | 6 | 6 | 6 |
| | LHSV ($h^{-1}$) | 2 | 1 | 1 | 1 | 2 | 1 | 1 | 1 |
| | Hydrogen/oil ratio (SCF/BBL) | 700 | 1000 | 3000 | 1000 | 700 | 1000 | 3000 | 1000 |
| | Reaction temperature (° C.) | 300 | 380 | 380 | 380 | 300 | 380 | 380 | 380 |
| | Specific Activity (Relative value assuming unused catalyst is 1) | 0.966 | 0.978 | 0.960 | 0.935 | 0.898 | 0.880 | 0.873 | 0.853 | obtained from an extended X-ray absorption fine structure spectrum of an X-ray absorption fine structure analysis.

2. A method of manufacturing a petroleum product, wherein hydrotreatment of a petroleum fraction is performed using the regenerated hydrotreatment catalyst according to claim 1.

3. The method according to claim 2, wherein conditions of the hydrotreatment of the petroleum fraction are a hydrogen partial pressure in the range of 3 to 13 MPa, LHSV in the range of 0.05 to 5 h$^{-1}$, a reaction temperature in the range of 200° C. to 410° C., a hydrogen/oil ratio in the range of 100 to 8,000 SCF/BBL, and a boiling point in the range of 130° C. to 700° C. of the petroleum fraction used as an oil feed stock.

4. A regenerated hydrotreatment catalyst regenerated from a hydrotreatment catalyst for treating a petroleum fraction, the hydrotreatment catalyst being prepared by supporting molybdenum and at least one species selected from metals of Groups 8 to 10 of the Periodic Table on an inorganic carrier containing an aluminum oxide, wherein, a residual carbon content is in the range of 0.15 mass % to 3.0 mass %, the ratio of a peak intensity of a molybdenum composite metal oxide to an intensity of a base peak is in the range of 0.60 to 1.10 in an X-Ray diffraction spectrum, and a content of $MoO_3$ is in the range of 77% to 99% of the total amount of $MoO_3$ and $MoS_2$ as determined by an X-ray absorption near-edge structure spectrum of an X-ray absorption fine structure analysis.

5. A method of manufacturing a petroleum product, wherein hydrotreatment of a petroleum fraction is performed using the regenerated hydrotreatment catalyst according to claim 4.

6. The method according to claim 5, wherein conditions of the hydrotreatment of the petroleum fraction are a hydrogen partial pressure in the range of 3 to 13 MPa, LHSV in the range of 0.05 to 5 h$^{-1}$, a reaction temperature in the range of 200° C. to 410° C., a hydrogen/oil ratio in the range of 100 to 8,000 SCF/BBL, and a boiling point in the range of 130° C. to 700° C. of the petroleum fraction used as an oil feed stock.

* * * * *